United States Patent
Hiratsuka et al.

(10) Patent No.: US 6,898,067 B1
(45) Date of Patent: May 24, 2005

(54) ELECTRIC DOUBLE-LAYER CAPACITOR

(75) Inventors: Kazuya Hiratsuka, Kanagawa (JP); Manabu Suhara, Kanagawa (JP); Takeshi Kawasato, Kanagawa (JP); Naruaki Tomita, Kanagawa (JP); Naoki Yoshida, Kanagawa (JP); Yoshiaki Higuchi, Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/674,279

(22) PCT Filed: Sep. 13, 1999

(86) PCT No.: PCT/JP99/04984

§ 371 (c)(1),
(2), (4) Date: Oct. 30, 2000

(87) PCT Pub. No.: WO01/20624

PCT Pub. Date: Mar. 22, 2001

(51) Int. Cl.$^7$ .................................................. H01G 4/35
(52) U.S. Cl. ...................... 361/302; 361/502; 361/503; 361/511; 361/512; 429/122; 429/129
(58) Field of Search ................................ 361/303, 502, 361/503, 504, 508, 510–512, 516, 518, 520, 523, 524, 530, 433, 525, 519, 529; 429/122, 129

(56) References Cited

U.S. PATENT DOCUMENTS

| | | | | |
|---|---|---|---|---|
| 4,562,511 A | * | 12/1985 | Nishino et al. | ............. 361/324 |
| 4,709,303 A | * | 11/1987 | Fujiwara et al. | ............ 361/502 |
| 5,646,815 A | * | 7/1997 | Owens et al. | ................ 361/502 |
| 6,072,693 A | | 6/2000 | Tsushima et al. | |
| 6,104,600 A | * | 8/2000 | Suhara et al. | ................ 361/502 |
| 6,424,517 B1 | | 7/2002 | Ikeda et al. | |
| 6,671,165 B1 | * | 12/2003 | Nakazawa et al. | .......... 361/502 |

FOREIGN PATENT DOCUMENTS

| | | |
|---|---|---|
| JP | 61-75512 | 4/1986 |
| JP | 3-59631 | 3/1991 |
| JP | 4-151816 | 5/1992 |
| JP | 9-260214 | 10/1997 |
| JP | 10-50557 | 2/1998 |
| JP | 11-135369 | 5/1999 |
| JP | 11-168033 | 6/1999 |

* cited by examiner

*Primary Examiner*—Dean A. Reichard
*Assistant Examiner*—Nguyen T. Ha
(74) *Attorney, Agent, or Firm*—Oblon, Spivak, McClelland, Maier & Neustadt, P.C.

(57) ABSTRACT

An electric double layer capacitor which has a low internal resistance and a large capacitance per unit volume and which is excellent in the voltage retention property, is provided.

In a non-aqueous type electric double layer capacitor having a separator disposed between a positive electrode and a negative electrode made of carbonaceous electrodes, the separator comprises a sheet having a thickness of from 10 to 100 $\mu$m and a porosity of from 50 to 90% and a netted spacer having a thickness of from 10 to 100 mm, a numerical aperture of from 30 to 85% and an opening of from 50 to 350 mesh, laminated one on the other.

14 Claims, No Drawings

ELECTRIC DOUBLE-LAYER CAPACITOR

TECHNICAL FIELD

The present invention relates to a non-aqueous electric double layer capacitor which has a high power output and a high energy density and which is excellent in the voltage-retention property.

BACKGROUND ART

Heretofore, as a separator to be disposed between positive and negative electrodes of an electric double layer capacitor, a polyethylene non-woven fabric, a polypropylene non-woven fabric, a polyester non-woven fabric, kraft paper, a rayon/sisal mixed sheet, a manila hemp sheet or a glass fiber sheet is, for example, known (e.g. JP-A-9-45586, JP-A-1-304719). The role of a separator is to electrically insulate the positive electrode from the negative electrode on one hand and to facilitate transfer of ions in the electrolyte, which takes place accompanying charge and discharge, on the other hand.

In recent years, an attention has been drawn to an electric double layer capacitor for high power applications. However, with a separator made of organic fibers of e.g. a polyethylene, the ion conductivity is low, and the internal resistance of the electric double layer capacitor is high, since the electrolyte absorbing property and the electrolyte-holding property are low. Accordingly, it instantaneous large current discharge was carried out as one of main characteristics of an electric double layer capacitor, the voltage drop was substantial, such being not practical.

Further, a conventional separator made of paper is excellent in heat resistance and tensile strength and is sometimes effective for an electric double layer capacitor to be used for a power source wherein no large current discharge is carried out, like a hybrid power source used with a solar cell. However, when a conventional separator made of paper is used for an electric double layer capacitor for high power applications, wherein the electrolyte is non-aqueous, the ion permeability tends to be inadequate.

With an electric double layer capacitor for high power applications, it is desired to lower the resistance and to increase the capacitance per unit volume (hereinafter referred to as capacitance density), and it is accordingly required to make the separator as thin as possible. At the same time, the separator is required to have a high porosity from the viewpoint of the electrolyte absorbing property and the electrolyte-holding property. However, if a separator made of paper having a high porosity is made thin, the insulating property between the positive and negative electrodes tends to be inadequate, thus leading to micro-short circuiting, self-discharge or a decrease in the yield in the production of the capacitor.

Further, when an electrolyte is impregnated to an element formed by laminating a plurality of electrodes with separators interposed or winding two sheets of electrodes with a separator interposed, so that the electrodes and the separator are laminated in close contact to one another, for example, with a separator made of a paper having a thickness of not more than 100 $\mu$m, there is a limit in increasing the porosity, and it takes much time to inject the electrolyte, thus leading to a problem in the productivity.

Accordingly, it is an object of the present invention to provide an electric double layer capacitor having a low resistance and a high capacitance density with good productivity by employing a separator which is excellent in heat resistance, ion permeability, electrolyte-absorbing property and electrolyte-holding property and which has high strength even when it is thin, and is excellent in the electrical insulating property.

DISCLOSURE OF THE INVENTION

The present invention provides an electric double layer capacitor comprising an element formed by disposing a separator between a positive electrode and a negative electrode made of carbonaceous electrodes, and a non-aqueous electrolyte impregnated to the element, wherein said separator comprises a sheet having a thickness of from 10 to 100 $\mu$m and a porosity of from 50 to 90%, and a netted spacer having a thickness of from 10 to 80 $\mu$m, a numerical aperture of from 30 to 80% and an opening of from 50 to 350 mesh, laminated one on the other.

Further, the present invention provides an electric double layer capacitor comprising an element formed by disposing a separator between a positive electrode and a negative electrode made of carbonaceous electrodes, and a non-aqueous electrolyte impregnated to the element, wherein said separator comprises a sheet having a thickness of from 10 to 100 $\mu$m and a porosity of from 50 to 90%, and a spacer layer formed of particles having an average particle size of from 0.1 to 20 $\mu$m, and having a thickness of from 10 to 80 $\mu$m and a porosity of from 50 to 85%, laminated one on the other.

BEST MODE FOR CARRYING OUT THE INVENTION

In the present invention, the thickness of the sheet is from 10 to 100 $\mu$m. If the thickness is less than 10 $\mu$m, the strength tends to be weak, and the handling tends to be difficult. If the thickness exceeds 100 $\mu$m, when it is laminated with a spacer to form a separator, the proportion of the volume occupied by the separator in the electric double layer capacitor element tends to be high, whereby the capacitance density of the electric double layer capacitor can not be made sufficiently high. Preferably, the thickness of the sheet is from 20 to 60 $\mu$m.

In the present invention, the porosity of the sheet is from 50 to 90%. If it is less than 50%, the electrolyte-absorbing property or the electrolyte-holding property, tends to be inadequate, and the ion permeability tends to be inadequate. If it exceeds 90%, the strength of the sheet tends to be weak, whereby the handling tends to be difficult. It is particularly preferably from 60 to 80%. Further, in the present invention, the sheet preferably has substantially no opening. If the sheet has pinholes, micro-short circuiting is likely to take place, and accordingly, it should preferably have no such pinholes.

In the present invention, the sheet is preferably a non-woven fabric or a porous film made of e.g. polypropylene, polyethylene, polytetrafluoroethylene, polyethylenesulfide or polyimide, or cellulose paper. Cellulose paper is particularly preferred, since a sheet of high strength can be obtained even when the porosity is high and the thickness is thin.

When cellulose paper is to be used, its density is preferably from 0.30 to 0.55 g/cm$^3$, whereby it is excellent in the electrolyte-absorbing property and the electrolyte-holding property. Particularly preferred is a range from 0.35 to 0.50 g/cm$^3$. With a high porosity sheet with a porosity of from 50 to 90% having adequate liquid-absorbing property and liquid-holding property for the electrolyte, if the thickness is for example at most 100 $\mu$m, it tends to have pinholes although the capacitance density of the electric double layer capacitor can be made high. Accordingly, if one such sheet is used as a separator for the electric double layer capacitor, short circuiting is likely due to the pinholes, and self-discharge is likely to result. On the other hand, in the present invention, the separator comprises the above sheet and the spacer laminated one on the other, whereby the electrolyte can be held in both the above sheet and the spacer, whereby liquid-holding can adequately be carried out even when a high density sheet is used, rather than the separator made solely of the above mentioned one sheet. If the density is high, the probability of the presence of pinholes in the sheet will be low. Further, even if the above sheet has pinholes, by the presence of the spacer the distance between the electrodes facing each other with the separator interposed, can be maintained, whereby no substantial self-discharge will take place, and it is possible to increase the yield in the production of the electric double layer capacitor.

Further, the spacer in the present invention is made of a netted spacer having a high numerical aperture and a large opening as compared with the sheet, or a layer of particles having a high porosity. Accordingly, when an electrolyte is impregnated to an element formed by laminating a plurality of electrodes with separators interposed therebetween or winding two sheets of electrodes with a separator interposed to laminate the electrodes in close contact with the separator, in order to produce an electric double layer capacitor having high capacitance, the injection of the electrolyte can be carried out in a short period of time, and the productivity of the electric double layer capacitor can be increased. Namely, in the case of a separator having the same thickness, a separator comprising the above sheet and the spacer scarcely undergoes self-discharge and is excellent in the electrolyte-absorbing property and the electrolyte-holding property, as compared with the separator made of the above-mentioned one sheet, whereby the productivity of the electric double layer capacitor having high capacitance, can be increased. Here, the numerical aperture represents the proportion of apertures. The above sheet may be used alone as a single sheet, but a plurality of the above sheets may be laminated with spacers to form a separator. Otherwise, the above sheet may be sandwiched between two sheets of spacers to form a separator. In such a case, the thickness of the separator tends to be thick, and such may be disadvantageous from the viewpoint of the capacitance density of the electric double layer capacitor, but the electrolyte-holding property can be increased, and adequate insulation can be attained even when the above sheet or spacer is thin. The above sheet and the spacer may be bonded by e.g. an adhesive, or may be bonded by heating or ultrasonic welding.

In the present invention, when cellulose paper is used as the above sheet, any one of a sheet made of rayon fibers or a mixed paper of cellulose with glass fibers or natural fibers, may be employed. Particularly preferred is a paper prepared to contain at least 50 wt % of fibers obtained by beating regenerated cellulose fibers. Here, the regenerated cellulose fibers to be used as a starting material are regenerated cellulose fibers which can be beaten by a beating machine installed in a usual papermaking process, such as regenerated cellulose fibers having a high degree of polymerization or solvent-spun rayon.

Regenerated cellulose fibers which can be beaten, will be uniformly fibrillated and will have increased flexibility by the beating treatment. Accordingly, the paper prepared to contain at least 50 wt % of such fibers, is excellent in tensile strength. Further, the fibers fibrillated by beating, are extremely dense, and the cross sections of fibrils are substantially circular. Accordingly, if the paper prepared to contain at least 50 wt % of such fibers, the separator will be excellent in the ion permeability and will have a low resistance. The fibers obtained by beating regenerated cellulose fibers, are more preferably at least 65 wt %, further preferably at least 80 wt %. The degree of beating is preferably such that beating is carried out until the Canadian Standard Freeness (hereafter referred as CSF value) stipulated in JIS P8121, will be from 0 to 600 ml.

Other material to be blended to the beaten regenerated cellulose fibers is not particularly limited, and fibers of e.g. manila hemp, sisal or craft pulp may be employed. Further, these materials are preferably beaten depending upon the degree of beating of the regenerated cellulose fibers.

In the present invention, the netted spacer has a thickness of from 10 to 100 $\mu$m, a numerical aperture of from 30 to 90% and an opening of from 50 to 350 mesh. In order to increase the electrolyte-absorbing property of the separator without impairing the ion conductivity, the numerical aperture should preferably be high, but in order to obtain adequate insulation between the electrodes, the numerical aperture should preferably be low, and the opening should preferably be small. Accordingly, they are selected from the above ranges. The netted spacer more preferably has a numerical aperture of from 40 to 70% and an opening of from 120 to 300 mesh. Here, the opening means the number of meshes per inch.

Further, if the thickness of the netted spacer exceeds 100 $\mu$m, the capacitance density of the electric double layer capacitor tends to be small, and if it is less than 10 $\mu$m, the distance between the electrodes tends to be inadequate, whereby micro-short circuiting is likely to take place, or the strength of the netted spacer tends to be weak, whereby the handling tends to be difficult during the production of the electric double layer capacitor. It is particularly preferably from 20 to 50 $\mu$m.

In the present invention, the netted spacer is preferably a net made of fibers. However, for example, it is possible to use a punched film other than the net. In such a case, the number of perforations formed by punching per inch corresponds to the opening for the purpose of the present invention.

The fibers constituting the net are not particularly limited, so long as they have high tensile strength and high stability against the electrolyte. In an electric double layer capacitor employing a non-aqueous electrolyte, drying treatment at a high temperature is preferably carried out in order to sufficiently remove moisture in the capacitor element, and accordingly, the net is preferably made of a material having high heat resistance. In order to carry out the removal of moisture by the above heat drying efficiently, a material having a heat resistant temperature of at least 150° C., particularly at least 200° C., is preferred. As such heat resistant fibers, a polyester, a polyimide, a fluorine-containing polyolefin such as polytetrafluoroethylene, or a polyphenylenesulfide, may, for example, be mentioned.

Further, the fibers constituting the net may be monofilaments or multifilaments. In order to make the thickness of the separator thin, monofilaments are preferred. The net is usually prepared by plain weaving of fibers. However, in order to make the thickness of the spacer thin, the fiber diameter of the fibers should better be slender and is preferably from 10 to 80 $\mu$m taking into consideration of the strength of the spacer.

Further, in the present invention, as the spacer, a spacer layer formed of particles having an average particle size of from 0.1 to 20 $\mu$m and having a thickness of from 10 to 80

μm and a porosity of from 50 to 85%, may be employed instead of the netted spacer. In this case, the spacer may be a spacer of a sheet form obtained by molding the above particles, or it may be a coating film formed by dispersing the particles in a solvent, followed by coating and drying on the above-mentioned sheet.

The above-mentioned particles are not particularly limited so long as they have high stability against the electrolyte. However, they preferably have the same heat resistance as the netted spacer, and for example, inorganic particles such as silica or alumina, or organic particles of e.g. polytetrafluoroethylene, may be mentioned.

The electric double layer capacitor of the present invention has a non-aqueous electrolyte. Accordingly, in order to reduce the leakage current and to secure the high withstanding voltage, it is necessary to remove moisture in the electric double layer capacitor element as far as possible. The moisture in the separator is preferably at most 1 wt %. However, for example, in the case of cellulose paper, it usually contains from 3 to 10 wt % of moisture.

In order to efficiently remove the moisture, it is preferred to preliminarily heat the separator at a temperature of at least 90° C. before it is disposed between the positive electrode and the negative electrode. Especially when in order to make an electric double layer capacitor having a large capacitance an element prepared by winding a pair of elongated electrodes with a separator interposed therebetween, is impregnated with an electrolyte and accommodated in a bottomed cylindrical container to have a cylindrical structure, or an element prepared by alternately laminating a plurality of positive and negative electrodes with a separator interposed therebetween, is impregnated with an electrolyte and accommodated in a rectangular container to have a rectangular structure, it tends to take time for the removal of the moisture after the formation of the element by the electrodes and the separator.

If the heat treatment temperature is lower than 90° C., the removal of moisture from the separator tends to be inadequate, and the effect of e.g. reducing the leakage current tends to decrease. If it becomes too high, the sheet or the spacer constituting the separator will undergo heat decomposition, and accordingly, the heat treatment temperature is determined taking into their heat resistant temperatures into consideration. For example, if cellulose paper is used as the sheet, when the heat treatment temperature exceeds 250° C., the thermal decomposition of the cellulose paper itself will start, whereby the strength tends to decrease or moisture-will be generated. The heat treatment time is suitably selected from the relation with the heat treatment temperature, but it is usually at least 3 seconds. As a method for the heat treatment, a method such as contacting with a heated heater, irradiation with infrared rays or heated air, may suitably be selected. Further, it is effective to employ reduced pressure treatment at the same time as the heating. For example, the sheet or the netted spacer to be used in the present invention is usually available in a rolled state. However, in the rolled state, it is difficult to effectively remove water in a short period of time by heating. If heating is conducted in a not closely overlaid state, removal of water can be carried out effectively, such being preferred. Specifically, for example, the rolled product of the sheet and the rolled product of the netted spacer are heated in a dry atmosphere while they are unrolled, and the sheet and the netted spacer are sequentially overlaid one on the other and rolled again to prepare a one separator rolled product, or the rolled product of the sheet and the rolled product of the netted spacer were preliminarily cut into a plurality of sheets of the sheet and the netted spacer, the heating and dehydration may be carried out so that the sheets and the netted spacers would not be overlaid one another, for example, by interposing a heat resistant spacer net.

In the electric double layer capacitor of the present invention, the electrodes for both positive and negative electrodes, are carbonaceous electrodes comprising a carbon material as the main component, and the capacitor is based-on a principle that electric charge is stored in an electric double layer formed at the interface between the electrodes and the electrolyte, or electric charge is stored in a pseudo electric double layer involving an electrochemical reaction. To increase the capacitance of an electric double layer capacitor, the specific surface area of the carbon material is preferably large, and the carbonaceous electrodes are preferably made of a carbon material having a specific surface area of from 100 to 2,500 $m^2/g$ and an organic binder.

As the carbon material, activated carbon, carbon black, polyacene, a carbon material having a mesophase layer or a carbon material having a graphite structure developed, may, for example, be used. To the carbonaceous electrodes, an electrically conductive material may be incorporated to increase the electrical conductivity, as the case requires. An organic binder is added thereto, followed by forming into a sheet shape on a metal current collector so that it is integrated with the current collector to form an electrode assembly. The organic binder to be used here, may preferably be, for example, a polyvinylidene fluoride, a polytetrafluoroethylene, a polyimide resin or a polyamide-imide resin. Further, the metal current collector may, for example, be a foil, a net or the like of e.g. aluminum or stainless steel. Particularly preferred is aluminum, since it is light in weight and has a low resistance.

The electrolyte to be used for an electric double layer capacitor includes an aqueous electrolyte and a non-aqueous electrolyte. However, the withstanding voltage is about 0.8 V with the aqueous electrolyte, while it is about 2.5 V with the non-aqueous electrolyte. The stored energy of an electric double layer capacitor is proportional to the square of the withstanding voltage. Accordingly, from the viewpoint of the energy density, it is preferred to use the non-aqueous electrolyte, as the energy density can be made larger by about 9 times.

The solute for the non-aqueous electrolyte for the electric double layer capacitor of the present invention is preferably at least one salt comprising a quaternary onium cation represented by $R^1R^2R^3R^4N$ or $R^1R^2R^3R^4P^+$, wherein each of $R^1$, $R^2$, $R^3$ and $R^4$ which are independent of one another, is a $C_{1-6}$ alkyl group, and an anion such as $BF_4^-$, $PF_6^-$, $SO_3CF_3^-$, $ASF_6^-$, $N(SO_2CF_3)_2^-$ or $ClO_4^-$.

Further, the organic solvent to be used for the non-aqueous electrolyte is preferably a cyclic carbonate such as ethylene carbonate, propylene carbonate or butylene carbonate, a linear carbonate such as dimethyl carbonate, ethyl methyl carbonate or diethyl carbonate, sulfolane or a sulfolane derivative. It is particularly preferably at least one member selected from the group consisting of propylene carbonate, ethylene carbonate, dimethyl carbonate, diethyl carbonate, methyl ethyl carbonate, acetonitrile, sulfolane and methylsulfolane.

As the shape of the electric double layer capacitor of the present invention, preferred is a cylindrical type prepared in such a manner that a pair of elongated electrodes are wound with an elongated separator interposed therebetween, to form an element, and the element is impregnated with a non-aqueous electrolyte and accommodated in a bottomed cylindrical casing, or an angular type prepared in such a manner that a plurality of rectangular electrodes as positive and negative electrodes are alternately stacked with a separator interposed therebetween, to form an element, and the element is impregnated with a non-aqueous electrolyte and accommodated in a bottomed rectangular casing, since it is thereby possible to obtain a large capacitance.

Now, the present invention will be described with reference to Example (Example 1) of the present invention and Comparative Examples (Examples 2 and 3), but the present invention is not limited by these Examples.

EXAMPLE 1

Solvent-spun rayon was beaten until the CSF value became 20 ml, and this rayon was used to prepare cellulose paper having a thickness of 40 μm and a density of 0.40 g/cm$^3$.

The breaking strength was 0.70 kg/cm-width, and the porosity was 72%.

A polyester net made of a polyester monofilament having a fiber diameter of 30 μm and having an opening of 250 mesh, a thickness of 47 μm and a numerical aperture of 50%, was laminated on the above cellulose paper, and this laminate was punched out in a rectangular shape having a width of 6.6 cm and a length of 13.6 cm, to obtain a separator.

A mixture comprising 80 wt % of high purity activated carbon powder having a specific surface area of 1800 m$^2$/g, 10 wt % of carbon black as an electrically conductive material and 10 wt % of polytetrafluoroethylene as a binder, was kneaded while dropwise adding ethanol, and then rolled to prepare a sheet electrode having a thickness of 140 mm. This electrode was dried at 200° C. for 30 minutes to remove ethanol, and then it was bonded to each side of an aluminum foil current collector having a thickness of 40 μm and having a lead terminal at a portion having a width of 6 cm and a length of 13 cm, by means of an electrically conductive adhesive, and further subjected to roll pressing to prepare an electrode having a thickness of 330 μm and integrated with the current collector. Such an electrode was used for the positive electrode and the negative electrode.

18 Sheets of the above positive electrode and 18 sheets of the above negative electrode were alternately laminated via the above separator, to obtain a laminated element. This element was accommodated in a bottomed angular aluminum casing having a height of 15 cm, a width of 7 cm and a thickness of 2.2 cm. To the positive electrode terminals and the negative electrode terminals attached insulatedly and air-tightly to the aluminum cover having an electrolyte inlet hole, the respective electrode leads were ultrasonically welded, and then the cover was fit into the opening of the angular casing, and the peripheral portions was subjected to laser welding for sealing.

Then, vacuum drying treatment was carried out at 200° C. for 24 hours in such a state that the electrolyte inlet hole of the cover was open. Then, using a solution having 1.5 mol/l of triethylmonomethylammonium tetrafluoroborate dissolved in propylene carbonate, as an electrolyte, it was impregnated under vacuum to the above element from the above inlet hole, then a safety bulb was attached at the electrolyte inlet hole to air-tightly seal the hole, to obtain an electric double layer capacitor.

Using the above electric double layer capacitor, constant voltage charging was carried out at 2.5 V for 30 minutes, and then discharging was carried out at a constant current of 300 mA to a level of 1.0 V, whereby the capacitance was obtained from the slope of the discharge curve from 2.5 V to 1.0 V. Further, from the voltage drop at the initial stage of charging, the internal resistance was calculated. Further, after constant voltage charging at 2.5 V for 12 hours, the cell was left to stand in an open circuit state, and the voltage retention after 72 hours was measured.

Further, the time until the electric double layer capacitor cell became constant at the above capacitance after completion of the vacuum impregnation of the electrolyte to the element, was measured, and this was taken as the electrolyte impregnation time. The results are shown in Table 1.

EXAMPLE 2

Comparative Example

An electric double layer capacitor cell was prepared in the same manner as in Example 1 except that the separator was made of a single sheet of the cellulose paper used in Example 1 and the number of sheets of the electrodes was changed to 23 sheets for both the positive electrodes and the negative electrodes. Using this cell, evaluation was carried out in the same manner as in Example 1. The results are shown in Table 1.

EXAMPLE 2

Comparative Example

An electric double layer capacitor was prepared in the same manner as in Example 1 except that the separator was made of two sheets of the cellulose paper used in Example 1. Using this cell, evaluation was carried out in the same manner as in Example 1. The results are shown in Table 1.

TABLE 1

|  | Capacitance (F) | Resistance (mΩ) | Electrolyte impregnation time | Voltage retention after 72 hrs. (V) |
| --- | --- | --- | --- | --- |
| Ex. 1 | 1850 | 2.2 | 0.5 min. | 2.45 |
| Ex. 2 | 2380 | 1.7 | 6 hrs. | 0.17 |
| Ex. 3 | 1850 | 2.3 | 30 min. | 1.51 |

INDUSTRIAL APPLICABILITY

According to the present invention, it is possible to obtain an electric double layer capacitor which has a low internal resistance and is excellent in the voltage retention property with small self-discharge and which has a high capacitance density. Further, the electric double layer capacitor of the present invention is excellent in the electrolyte-absorbing property at the time of preparation, even if it has a structure wherein electrodes and separators are laminated and disposed at a high density, and accordingly the productivity is high.

The separator in the present invention is highly strong and has adequate strength for winding, whereby a wound type electric double layer capacitor can easily be prepared. The electric double layer capacitor of the present invention is particularly suitable for a wound type or laminated type electric double layer capacitor for a large current and large capacity, having a discharge capacitance of from 50 to 20,000 F or a discharge current of from 1 to 1,000 A.

What is claimed is:

1. An electric double layer capacitor comprising an element formed by disposing a separator between a positive electrode and a negative electrode made of carbonaceous electrodes, and a non-aqueous electrolyte impregnated to the element, wherein said separator comprises a sheet having a thickness of from 10 to 100 μm and a porosity of from 50 to 90%, and a netted spacer having a thickness of from 10 to 80 μm, an open area of from 30 to 80% and an opening of from 50 to 350 mesh, laminated one on the other.

2. The electric double layer capacitor according to claim 1, wherein the netted spacer is a net made of fibers of a polyester, a polyimide, a fluorine-containing polyolefin or a polyphenylene sulfide.

3. The electric double layer capacitor according to claim 2, wherein the sheet is made of cellulose paper.

4. The electric double layer capacitor according to claim 3, wherein the cellulose paper is paper prepared to contain at least 50 wt % of fibers obtained by beating regenerated cellulose fibers.

5. The electric double layer capacitor according to claim 1, wherein the netted spacer is a net made of fibers having a fiber diameter of from 10 to 80 μm.

6. The electric double layer capacitor according to claim 1, wherein the sheet is made of cellulose paper.

7. The electric double layer capacitor according to claim 6, wherein the cellulose paper is paper prepared to contain at least 50 wt % of fibers obtained by beating regenerated cellulose fibers.

8. The electric double layer capacitor according to claim 1, wherein the carbonaceous electrodes comprise a carbon material having a specific surface area of 100 to 2500 m$^2$/g and an organic binder.

9. An electric double layer capacitor comprising an element formed by disposing a separator between a positive electrode and a negative electrode made of carbonaceous electrodes, and a non-aqueous electrolyte impregnated to the element, wherein said separator comprises a sheet having a thickness of from 10 to 100 μm and a porosity of from 50 to 90%, and a spacer layer formed of particles having an average particle size of from 0.1 to 20 μm, and having a thickness of from 10 to 80 μm and a porosity of from 50 to 85%, laminated one on the other.

10. The electric double layer capacitor according to claim 9, wherein the sheet is made of cellulose paper.

11. The electric double layer capacitor according to claim 10, wherein the cellulose paper is paper prepared to contain at least 50 wt % of fibers obtained by beating regenerated cellulose fibers.

12. The electric double layer capacitor according to claim 9, wherein the carbonaceous electrodes comprise a carbon material having a specific surface area of 100 to 2,500 m$^2$/g and an organic binder.

13. The electric double layer capacitor according to claim 1, wherein the non-aqueous electrolyte comprises a solute which is a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion of $BF_4^-$, $PF_6^-$, $CF_3SO_3^-$, $AsF_6^-$, $N(SO_2CF_3)_2^-$ or $ClO_4^-$, and a solvent which is at least one member selected from the group consisting of propylene carbonate, ethylene carbonate, dimethyl carbonate, diethyl carbonate, methylethyl carbonate, acetonitrile, sulfolane and methylsulfolane.

14. The electric double layer capacitor according to claim 9, wherein the non-aqueous electrolyte comprises a solute which is a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion of $BF_4^-$, $PF_6^-$, $CF_3SO_3^-$, $AsF_6^-$, $N(SO_2CF_3)_2^-$ or $ClO_4^-$, and a solvent which is at least one member selected from the group consisting of propylene carbonate, ethylene carbonate, dimethyl carbonate, diethyl carbonate, methylethyl carbonate, acetonitrile, sulfolane and methylsulfolane.

* * * * *